(12) United States Patent
Hamada

(10) Patent No.: US 8,019,193 B2
(45) Date of Patent: *Sep. 13, 2011

(54) SETTING RATE FOR RECORDING BROADCAST TRANSMISSION ACCORDING TO TRANSMISSION RATE

(75) Inventor: Ichiro Hamada, Kanagawa (JP)

(73) Assignee: Sony Corporation (JP)

( * ) Notice: Subject to any disclaimer, the term of this patent is extended or adjusted under 35 U.S.C. 154(b) by 1407 days.

This patent is subject to a terminal disclaimer.

(21) Appl. No.: 11/272,163

(22) Filed: Nov. 10, 2005

(65) Prior Publication Data

US 2006/0062547 A1    Mar. 23, 2006

Related U.S. Application Data

(63) Continuation of application No. 09/692,987, filed on Oct. 20, 2000, now Pat. No. 6,996,332.

(30) Foreign Application Priority Data

Oct. 22, 1999    (JP) .................................. P11-300612

(51) Int. Cl.
    *H04N 5/932*    (2006.01)
(52) U.S. Cl. ...................................... 386/221
(58) Field of Classification Search .......... 386/124–126, 386/129, 80, 46, 212, 213, 214, 231, 221

See application file for complete search history.

(56) References Cited

U.S. PATENT DOCUMENTS

| 5,363,264 A | 11/1994 | Cavanaugh et al. |
| 5,585,933 A | 12/1996 | Ichige et al. |
| 5,687,275 A | 11/1997 | Lane et al. |
| 5,740,306 A * | 4/1998 | Shinohara et al. ............... 386/67 |
| 5,887,115 A | 3/1999 | Boyce et al. |
| 5,973,625 A | 10/1999 | Nam |
| 5,987,213 A | 11/1999 | Mankovitz et al. |
| 6,128,316 A * | 10/2000 | Takeda et al. .................. 370/468 |
| 6,256,390 B1 | 7/2001 | Okuyama et al. |
| 6,292,846 B1 | 9/2001 | Hara et al. |
| 6,366,630 B1 | 4/2002 | Okuyama |
| 6,442,208 B1 | 8/2002 | Horiguchi et al. |
| 6,453,364 B1 | 9/2002 | Hara |
| 6,574,692 B1 | 6/2003 | Shindo |
| 6,591,419 B2 | 7/2003 | Barry et al. |
| 2001/0009603 A1 | 7/2001 | Ihara et al. |
| 2001/0028780 A1 | 10/2001 | Na et al. |

(Continued)

FOREIGN PATENT DOCUMENTS

CA    2212333    *    2/1998

(Continued)

*Primary Examiner* — David E Harvey
(74) *Attorney, Agent, or Firm* — Lerner, David, Littenberg, Krumholz & Mentlik, LLP

(57) ABSTRACT

A digital broadcast, in which video data and audio data are transmitted in the form of a transport stream, is received in a digital broadcast receiver and is decoded to provide a received transport stream. A first interface of the digital broadcast receiver is connected to a corresponding interface of a recording apparatus. Information corresponding to a transmission rate of the received transport stream is determined. A recording rate setting command is generated on the basis of the information corresponding to the transmission rate. The recording rate setting command is transmitted to the recording apparatus through the first interface and the corresponding interface when the connection between the first interface and the corresponding interface is initiated, when a request command is received from the recording apparatus, or periodically after predetermined intervals.

12 Claims, 9 Drawing Sheets

U.S. PATENT DOCUMENTS

2002/0064180 A1    5/2002   Takeda et al.

FOREIGN PATENT DOCUMENTS

| | | |
|---|---|---|
| CA | 2212333 A1 | 2/1998 |
| EP | 0 650 296 A2 | 4/1995 |
| EP | 763947 * | 3/1997 |
| EP | 0763947 A2 | 3/1997 |
| EP | 0 859 523 A2 | 8/1998 |
| EP | 0 929 072 A2 | 7/1999 |
| EP | 0 936 819 A2 | 8/1999 |
| EP | 0 940 983 A1 | 9/1999 |
| JP | 63155877 A | 6/1988 |
| JP | 7230666 A | 8/1995 |
| JP | 9-083949 A | 3/1997 |
| JP | 10-051737 A | 2/1998 |
| JP | 10-126834 A | 5/1998 |
| JP | 11-096670 A | 4/1999 |
| JP | 11-177955 A | 7/1999 |
| JP | 11-213524 A | 8/1999 |
| JP | 11-224462 A | 8/1999 |

* cited by examiner

FIG. 6

COMPONENT DESCRIPTOR

| DATA STRUCTURE | BIT NUMBER | BIT SEQUENCE EXPRESSION |
|---|---|---|
| component_descriptor () { | | |
|     descriptor_tag | 8 | uimsbf |
|     descriptor_length | 8 | uimsbf |
|     reserved_future_use | 4 | bslbf |
|     stream_content | 4 | uimsbf |
|     component_type | 8 | uimsbf |
|     component_tag | 8 | uimsbf |
|     ISO_639_language_code | 24 | bslbf |
|     for (i = 0;i < N;i++) } | | |
|         text_char | 8 | uimsbf |
|     } | | |
| } | | |

FIG. 7

| COMPONENT CONTENT | COMPONENT TYPE | DESCRIPTOR |
|---|---|---|
| 0x00 | 0x00-0xFF | RESERVE FOR FUTURE USE |
| 0x01 | 0x00 | RESERVE FOR FUTURE USE |
| 0x01 | 0x01 | PICTURE 480i (525i), ASPECT RATIO 4:3 |
| 0x01 | 0x02 | PICTURE 480i (525i), ASPECT RATIO 16:9, PAN VECTOR |
| 0x01 | 0x03 | PICTURE 480i (525i), ASPECT RATIO 16:9, NO PAN VECTOR |
| 0x01 | 0x04 | PICTURE 480i (525i), ASPECT RATIO > 16:9 |
| 0x01 | 0x05-0xA0 | RESERVE FOR FUTURE USE |
| 0x01 | 0xA1 | PICTURE 480p (525p), ASPECT RATIO 4:3 |
| 0x01 | 0xA2 | PICTURE 480p (525p), ASPECT RATIO 16:9, PAN VECTOR |
| 0x01 | 0xA3 | PICTURE 480p (525p), ASPECT RATIO 16:9, NO PAN VECTOR |
| 0x01 | 0xA4 | PICTURE 480p (525p), ASPECT RATIO > 16:9 |
| 0x01 | 0xA5-0xB0 | RESERVE FOR FUTURE USE |
| 0x01 | 0xB1 | PICTURE 1080i (1125i), ASPECT RATIO 4:3 |
| 0x01 | 0xB2 | PICTURE 1080i (1125i), ASPECT RATIO 16:9, PAN VECTOR |
| 0x01 | 0xB3 | PICTURE 1080i (1125i), ASPECT RATIO 16:9, NO PAN VECTOR |
| 0x01 | 0xB4 | PICTURE 1080i (1125i), ASPECT RATIO > 16:9 |
| 0x01 | 0xB5-0xFF | RESERVE FOR FUTURE USE |
| 0x02 | 0x00 | RESERVE FOR FUTURE USE |
| 0x02 | 0x01 | VOICE, SINGLE MONAURAL |
| 0x02 | 0x02 | VOICE, DUAL MONAURAL |
| 0x02 | 0x03 | VOICE, STEREO (2 CHANNELS) |
| 0x02 | 0x04 | VOICE, PLURAL LANGUAGES, MULTICHANNEL |
| 0x02 | 0x05 | VOICE, SURROUND |
| 0x02 | 0x06-0x3F | RESERVE FOR FUTURE USE |
| 0x02 | 0x40 | VOICE EXPLANATION FOR VISUAL DISORDER |
| 0x02 | 0x41 | VOICE FOR HEARING DISORDER |
| 0x02 | 0x42-0xAF | RESERVE FOR FUTURE USE |
| 0x02 | 0xB0-0xFE | DEFINITION OF BUSINESS MAN |
| 0x02 | 0xFF | RESERVE FOR FUTURE USE |
| 0x03-0x0B | 0x00-0xFF | RESERVE FOR FUTURE USE |
| 0x0C-0x0F | 0x00-0xFF | DEFINITION OF BUSINESS MAN |

SETTING RATE FOR RECORDING BROADCAST TRANSMISSION ACCORDING TO TRANSMISSION RATE

CROSS-REFERENCE TO RELATED APPLICATIONS

This application is a continuation of U.S. application Ser. No. 09/692,987, filed Oct. 20, 2000, the disclosure of which is incorporated herein by reference.

BACKGROUND OF THE INVENTION

The present invention relates to a digital broadcast receiver, a recording apparatus and a data recording method which are suitably used in a digital satellite broadcast system for receiving signals of video data and audio data broadcasted in the form of an MPEG (Motion Picture Experts Group) 2 transport stream and recording/reproducing the MPEG2 transport stream thus received in a recording medium such as a digital video tape or the like.

Recently, the digital satellite broadcast system has just started to achieve widespread use. In the digital satellite broadcast system, digital video data and digital audio data contained in a digital satellite broadcast are compressed, and then transmitted in packets in the form of a transport stream based on the MPEG2 system (an MPEG2 transport stream). In order to receive such a digital satellite broadcast, a digital satellite broadcast receiving decoder referred to as an IRD (Integrated Receiver Decoder) is connected to a television receiver. The MPEG2 transport stream is received by a parabolic antenna and is demodulated by the IRD to extract video and audio packets of a desired program, and a video signal and an audio signal are decoded from the video and audio packets. The video signal and audio signal are then supplied from the IRD to the television receiver.

It has been proposed to equip an IEEE1394 digital interface to the IRD for receiving such a digital satellite broadcast. The IEEE1394 digital interface supports an isochronous transfer mode and an asynchronous transfer mode. In the isochronous transfer mode, a delay time of transmission is compensated, and it is suitably used to transmit a time-sequential data stream such as video data and audio data at a high speed. On the other hand, in the asynchronous transfer mode, it is guaranteed that data can be surely transmitted to a destination node, and thus it is suitably used to surely transmit data such as commands or the like.

When the IRD is equipped with the IEEE1394 digital interface, a digital satellite broadcast receiving and recording/reproducing system can be constructed by connecting the IRD and a recording/reproducing apparatus or the like to each other. If such a system is constructed, the MPEG2 transport stream transmitted with the digital satellite broadcast can be directly recorded/reproduced.

That is, under the recording operation, an MPEG2 transport stream received at the IRD side is transmitted to the recording/reproducing apparatus through the IEEE1394 digital interface, and it is directly recorded in a recording medium by the recording/reproducing apparatus. Under the reproducing operation, the MPEG2 transport stream is reproduced from the recording medium, and the MPEG2 transport stream thus reproduced is transmitted to the IRD through the IEEE1394 digital interface. The MPEG2 transport stream thus transmitted is decoded by the IRD.

When the IRD is equipped with the IEEE1394 digital interface and both the IRD and the recording/reproducing apparatus are connected to each other to construct the digital satellite broadcast receiving and recording/reproducing system as described above, it is expected that a digital video cassette recording/reproducing apparatus using a video cassette which is compatible with a conventional analog system is used as a recording/reproducing apparatus. With such a digital video cassette recording/reproducing apparatus, transport streams can be recorded at a recording rate of 14.1 Mpbs. In the case of an SDTV (Standard Definition TV) transport stream based on the NTSC system having an aspect ratio of 3:4 and 525 scanning lines, the transmission rate is, for example, equal to 8 Mbps, and thus if such a digital video cassette recording/reproducing apparatus is used, the SDTV transport stream can be directly recorded.

However, for a digital satellite broadcast system which will be developed in the future, it is planed that not only the SDTV broadcast, but also the HDTV (High Definition TV) broadcast will be carried out. The HDTV broadcast is defined as a broadcast based on a high definition television having an aspect ratio of 16:9 and 1125 scanning lines, and the transmission rate thereof is, for example, equal to 24 Mbps. Therefore, with the digital video cassette recording/reproducing apparatus having the recording rate of 14.1 Mbps as described above, MPEG2 streams transmitted in the HDTV system cannot be directly recorded.

Therefore, when an HDTV transport stream is recorded/reproduced by using such a digital video cassette recording/reproducing apparatus, the mode of the recording/reproducing apparatus is switched to a high-speed recording rate.

That is, the recording rate of such a digital video cassette recording/reproducing apparatus is equal to 14.1 Mbps as described above, and if the recording time is reduced to a half in the digital video cassette recording/reproducing apparatus as described above, double amount of data can be recorded. In this case, the recording rate is equal to 28.2 Mbps. The transmission rate of the HDTV stream is, for example, equal to 24 Mbps, and thus, if the recording rate is set to 28.2 Mbps, the HDTV stream can be sufficiently recorded.

The recording mode of 14.1 Mbps serving as the standard is called as an STD mode, and a recording mode which is achieved by reducing the recording time of the STD mode to a half to enhance the recording rate to 28.2 Mbps is called an HS mode.

If the HS mode whose recording rate is increased to be twice as high as that of the STD mode can be set in addition to the STD mode serving as the standard recording mode, both the SDTV stream having an aspect ratio of 4:3 and 525 scanning lines and the HDTV stream having an aspect ratio of 16:9 and 1125 scanning lines can be recorded. That is, when signals from the IRD are recorded by using the digital video cassette recording/reproducing apparatus in such a system, the STD mode is set if an SDTV broadcast is to be recorded, or the HS mode is set if an HDTV broadcast is to be recorded.

When the recording mode of the digital video cassette recording/reproducing apparatus is set in accordance with whether the broadcast to be recorded is SDTV or HDTV as described above, the recording mode is required to be accurately and correctly set before the digital video cassette recording/reproducing apparatus is allowed to perform the recording operation.

In the conventional system in which the IRD is connected to a digital video cassette recording/reproducing apparatus in which both the STD mode and the HS mode can be set, there may occur such a situation that the recording is started regardless of whether a correct recording mode is set or not.

That is, in such a system where the IRD is connected to a digital video cassette recording/reproducing apparatus through IEEE1394, the mode of the digital video cassette recording/reproducing apparatus can be set on the basis of a command from the IRD. When such a command is issued from the IRD, the digital video cassette recording/reproducing apparatus is set to a recordable state regardless of whether the recording mode corresponding to the transmission rate of a stream being transmitted is correctly set or not.

In this system, when a recording button of the digital video cassette recording/reproducing apparatus is pushed, the digital video cassette recording/reproducing apparatus is set to the recordable state regardless of whether the recording mode corresponding to the transmission rate of a stream being transmitted is correctly set or not.

As described above, in the conventional system a situation may occur such that the recording is started under the state that the right recording mode is not set. Accordingly, there may occur such a situation that the recording mode of the digital video cassette recording/reproducing apparatus may be set to the HS mode although an SDTV broadcast is to be recorded, so that the recording efficiency is wasted. Further, the recording mode of the digital video cassette recording/reproducing apparatus may be set to the STD mode although an HDTV broadcast is to be recorded, so that overflow of bits occurs and correct data cannot be recorded.

SUMMARY OF THE INVENTION

Therefore, an object of this invention is to provide a digital broadcast receiver, a recording apparatus and a data recording method such that when a stream from a receiver is recorded in a recording/reproducing apparatus, the optimum recording mode corresponding to the transmission rate of the stream is correctly set before the recording of the recording/reproducing apparatus has started.

In order to attain the above object, according to the present invention, a recording apparatus comprises:

interface means for receiving/transmitting transport streams and commands from/to a digital broadcast receiver;

recording means for recording a transport stream transmitted from the digital broadcast receiver through the interface means; and recording rate setting means for setting the recording rate of the recording means in accordance with a set command of the recording rate transmitted from the digital broadcast receiver.

Still furthermore, according to the present invention, a data recording method is characterized in that a digital broadcast receiver, for receiving a digital broadcast containing video data and audio data transmitted in the form of a transport stream and decoding the digital broadcast, is connected through an interface means to a digital recording apparatus for recording a transport stream from the digital broadcast receiver, and the receiver judges information corresponding to the transmission rate of a received transport stream of a digital broadcast, and generates a set command of the recording rate for a recording/reproducing apparatus on the basis of the information corresponding to the transmission rate.

Accordingly, a system is constructed by connecting the digital broadcast receiver, for receiving a digital broadcast containing video data and audio data transmitted in the form of a transport stream, through the interface means to the digital recording apparatus for recording the transport stream from the digital broadcast receiver. The receiver judges the information corresponding to the transmission rate of the transport stream of the received digital broadcast, and generates the set command of the recording rate through the interface for the recording/reproducing apparatus on the basis of the information corresponding to the transmission rate. By transmitting the set command of the recording rate to the recording/reproducing apparatus just before the receiver transmits the stream when the channel is switched, when the program is switched or every predetermined period, the optimum recording rate is correctly set when the recording operation is started in the recording/reproducing apparatus.

BRIEF DESCRIPTION OF THE DRAWINGS

FIG. 6 is a schematic diagram used to explain a component descriptor;

FIG. 7 is a schematic diagram used to a component content and a component type;

DETAILED DESCRIPTION

Preferred embodiments of the present invention will be described hereunder with reference to the accompanying drawings.

Figure 1:
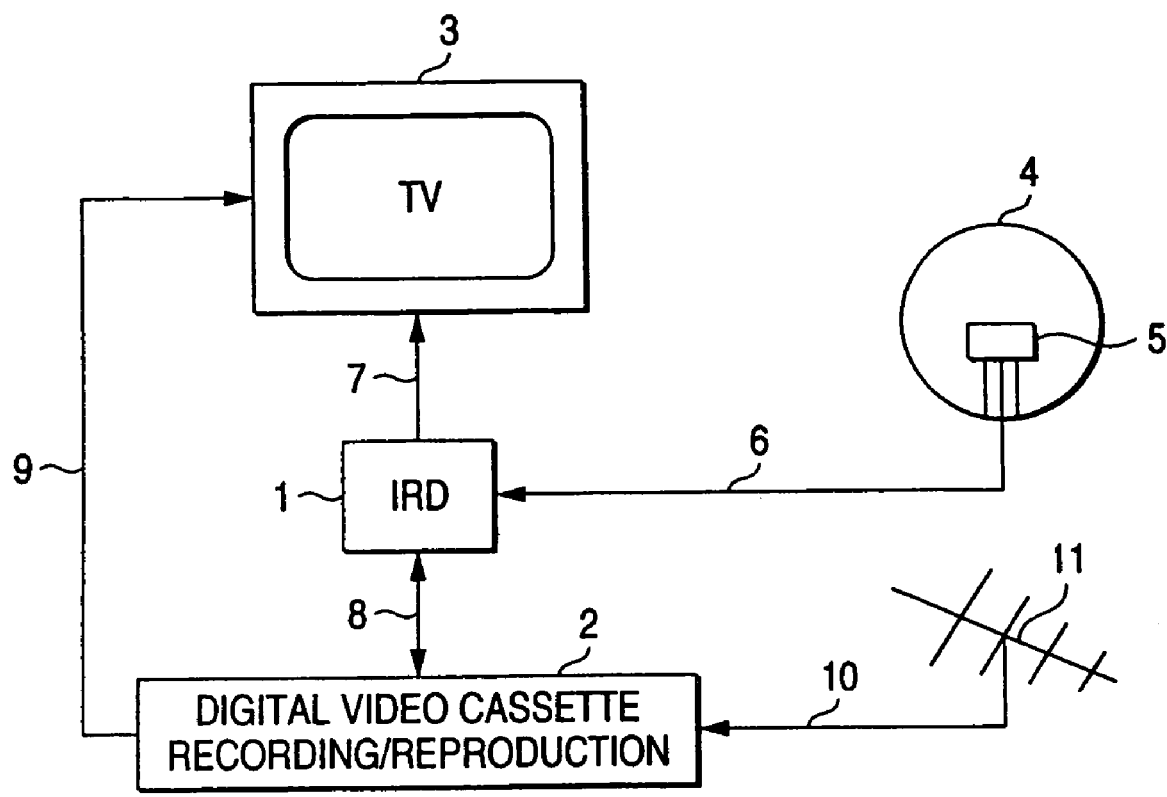
FIG. 1 is a block diagram showing an example of a digital satellite broadcast system to which the present invention is applied.

In FIG. 1, reference numeral 1 represents an IRD, reference numeral 2 represents a digital video cassette recording/reproducing apparatus, reference numeral 3 represents a television receiver. A digital satellite broadcast receiving and recording/reproducing system is constructed by IRD 1, the digital video cassette recording/reproducing apparatus 2 and the television receiver 3. IRD 1 and the digital video cassette receiving and recording/reproducing apparatus 2 are equipped with an IEEE1394 digital interface, and IRD 1 and the digital video cassette recording/reproducing apparatus 2 are connected to each other through a cable 8 of the IEEE1394 digital interface.

IRD 1 decodes the reception signal of a digital broadcast to form a video signal and an audio signal. As known in the art, an SDTV system is based on the NTSC system and has an aspect ratio of 4:3 and a scanning number of 525; while an HDTV system is based on a high definition television system and has an aspect ratio of 16:9 and a scanning number of 1125.

In the digital satellite broadcast, plural programs are multiplexed and transmitted with one carrier. The number of programs which can be multiplexed with one carrier is dependent on the satellite transponder band used for the digital broadcast and the band of a program to be transmitted. In the case of video signals of the SDTV system having a narrow transmission band, programs of many channels can be transmitted with one carrier. In the case of an HDTV system, the number of channels which can be transmitted with one carrier is small because the transmission band is broad. Further, there may be a case that an SDTV stream and an HDTV stream are transmitted with one carrier.

An antenna terminal of IRD 1 is connected to a low noise converter 5 through a cable 6. The electric wave from a satellite is transmitted in the 12 GHz band. The electric wave from the satellite is converted to signals in the 1 GHz band, for example, by a low noise converter 5 secured to a parabolic antenna 4.

The output of the low noise converter 5 is supplied to the antenna terminal of IRD 1 through the cable 6. In IRD 1, the signal of a desired carrier is selected from the reception signal, and an MPEG2 transport stream is demodulated. A video packet and an audio packet in a desired program are extracted from this transport stream, and processing is carried out on the video packet and the audio packet to decode the video signal and the audio signal.

The video output terminal and the audio output terminal of IRD 1 are connected to the video input terminal and the audio input terminal of the television receiver 3 through a cable 7. The video signal and the audio signal decoded in IRD 1 are supplied to the video input terminal and the audio input terminal of the television receiver 3, and reception frames of the desired program are displayed on the television receiver 3 and the voice thereof is output therefrom.

The digital video cassette recording/reproducing apparatus 2 performs digital recording and analog recording with the same tape cassette. IRD 1 and the digital video cassette recording/reproducing apparatus 2 are connected to each other through the cable 8 of the IEEE1394 digital interface.

The video output terminal and the audio output terminal of the digital video cassette recording/reproducing apparatus 2 are connected to the video input terminal and the audio input terminal of the television receiver 3 through a cable 9. The antenna terminal of the digital video cassette recording/reproducing apparatus 2 is connected to a ground wave antenna 11 through a cable 10.

In this system, the MPEG2 transport stream received by IRD 1 can be recorded/reproduced in the digital video cassette recording/reproducing apparatus 2.

When the MPEG2 transport stream based on the reception output of the digital satellite broadcast received by IRD 1 is recorded on a tape cassette mounted on the digital video cassette recording/reproducing apparatus 2, an MPEG2 transport stream of a desired program is output from IRD1. The MPEG2 transport stream from IRD 1 is supplied to the digital video cassette recording/reproducing apparatus 2 through the IEEE1394 cable 8, and the MPEG2 transport stream is recorded on the tape cassette mounted on the digital video cassette recording/reproducing apparatus 2.

The digital video cassette recording/reproducing apparatus 2 can perform analog recording on a tape cassette mounted thereon by performing analog processing on a ground wave broadcast signal. When the ground wave broadcast signal is subjected to the analog processing to be recorded on the tape cassette, the ground wave broadcast is received by the antenna 11 and then the reception signal is supplied to a ground wave tuner circuit in the digital video cassette recording/reproducing apparatus 2. In the ground wave tuner, a desired channel signal is selected, and an analog video signal and an audio signal are demodulated from the reception signal. The analog video signal and the audio signal are analog-recorded on the tape cassette mounted on the digital video cassette recording/reproducing apparatus 2.

When the video cassette on which the video signal and the audio signal are analog-recorded is reproduced, the video cassette is mounted on the digital video cassette recording/ reproducing apparatus 2 to perform the reproducing operation. In the digital video cassette recording/reproducing apparatus 2, the reproduction signal is transmitted to the television receiver 3 through the cable 9, and the reception frames based on the analog signal reproduced from the tape cassette are displayed on the television receiver 3 and the voice thereof is output therefrom. Likewise, the digital video cassette recording/reproducing apparatus 2 can receive an analog video signal from analog equipment such as 8-mm VTR or the like and an analog audio signal, and analog-record the signals on a mounted tape cassette.

The digital video cassette recording/reproducing apparatus 2 can also subject a ground wave signal to digital processing and record it on a mounted tape cassette.

When an analog ground wave signal is subjected to digital processing and recorded on a tape cassette, the ground wave broadcast signal is received by the antenna 11, and this reception signal is supplied to the ground wave tuner circuit in the digital video cassette recording/reproducing apparatus 2. In this ground wave tuner circuit, a desired channel signal is selected, and an analog video signal and an audio signal are demodulated from the reception signal. The analog video signal and the audio signal are subjected to compression coding according to the MPEG2 format, and digitally recorded on a tape cassette mounted on the digital video cassette recording/reproducing apparatus 2.

When a video cassette on which a video signal and an audio signal of an analog ground wave broadcast are digitally recorded is reproduced, the video cassette is mounted on the digital video cassette recording/reproducing apparatus 2 and reproduced. When the reproduction signal is digitally reproduced in the digital video cassette recording/reproducing apparatus 2, it is output to IRD 1 through the IEEE1394 cable 8 and reproduced. When the reproduction signal is analog-output, it is subjected to compression-decoding according to the MPEG format and the analog-output is transmitted to the television receiver 3 through the cable 7, the reception frames based on the analog signal reproduced from the tape cassette are displayed on the television receiver 3, and the voice thereof is output therefrom. Likewise, the digital video cassette recording/reproducing apparatus 2 can subject the digital processing to the analog video signal and the analog audio signal input from analog equipment such as 8-mm VTR or the like to digitally record the signals on a mounted tape cassette.

Figure 2:
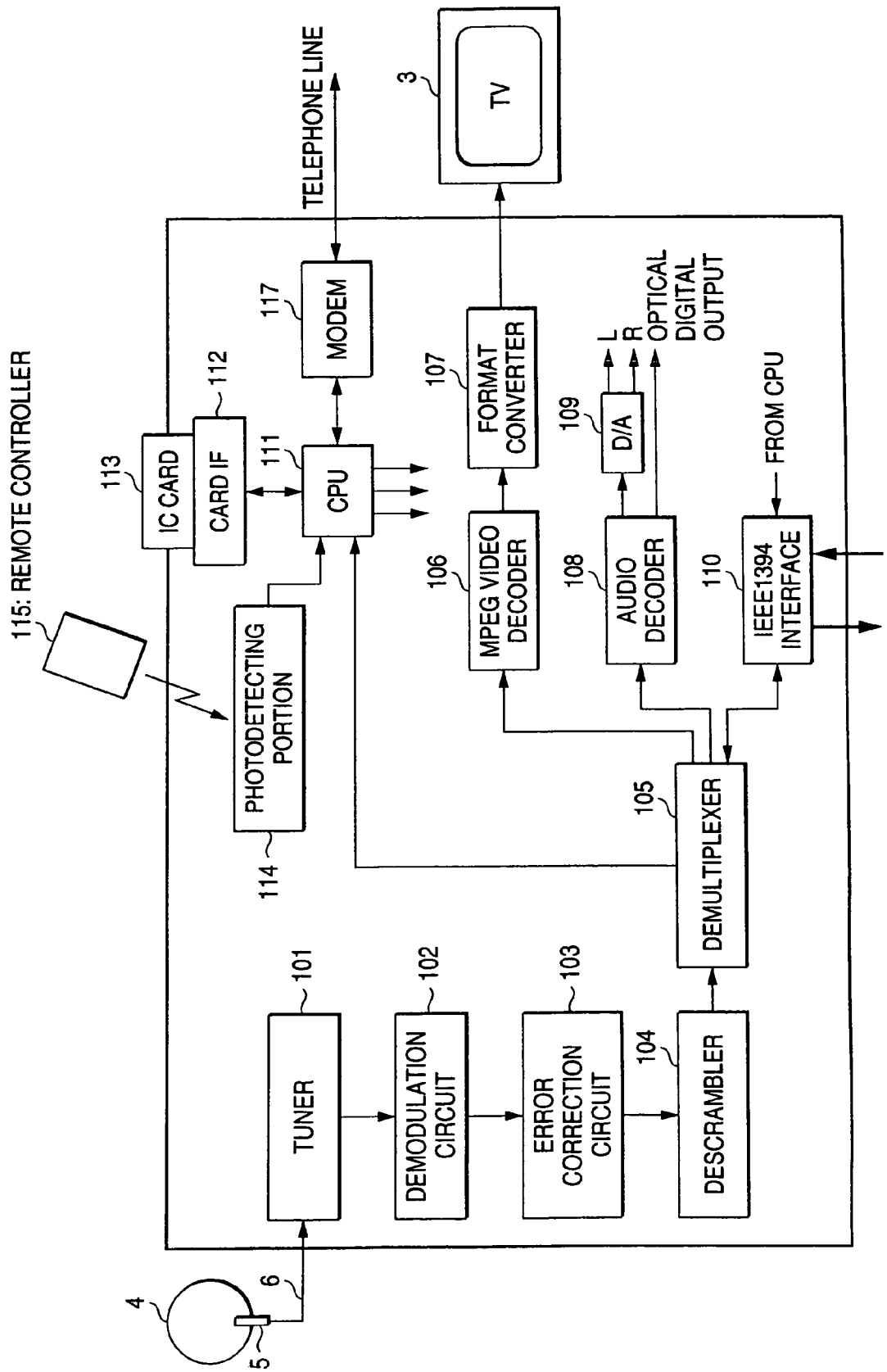
FIG. 2 is a block diagram showing an example of an IRD in the digital satellite broadcast system to which the present invention is applied.

FIG. 2 shows the construction of IRD 1. As shown in FIG. 2, for example, the digital satellite broadcast electric wave transmitted through a satellite with electric wave in the 12 GHz band is received by the parabola antenna 4, and converted to signals in the 1 GHz band by the low noise converter 5 secured to the parabola antenna 4. The output of the low noise converter 5 is supplied to the tuner circuit 101 of IRD 1 through the cable 6.

On the basis of a control CPU (Central Processing Unit) 111, the tuner circuit 101 selects a signal having a desired carrier frequency from the reception signal. The signal of the carrier frequency thus selected is supplied to a demodulation circuit 102. For example, QPSK (Quadrature Phase Shift Keying) demodulation processing is carried out in the demodulation circuit 102. The signal thus demodulated is supplied to an error correction processing circuit 103. In the error correction processing circuit 103, error correction processing is carried out by using Reed-Solomon coding or Viterbi decoding.

The output of the error correction circuit 103 is supplied to a descrambler 104. The descrambler 104 is supplied with contract information received and also with descrambling key data stored in an IC card 113 mounted in an IC card slot 112.

The descrambler 104 descrambles an MPEG2 transport stream by using the contract information received and the key data of the IC card 113. The MPEG2 transport stream thus descrambled is transmitted to a demultiplexer 105.

The demultiplexer 105 separates a desired packet from the stream from the descrambler 104 on the basis of an instruction from CPU 111. The transmission packet is equipped with a packet identifier (PID) at the header portion thereof. In the demultiplexer 105, a video packet and an audio packet of a desired program are extracted on the basis of the PID. The video packet of the desired program is transmitted to an MPEG2 video decoder 106, and the audio packet is transmitted to an MPEG audio decoder 108.

The MPEG2 video decoder 106 receives the packet of the video signal from the demultiplexer 105, and carries out the decoding processing of the MPEG2 system to form video data. The video data are supplied to a format converter 107. In the format converter 107, the digital video signal output from the MPEG2 video decoder is converted to an SDTV video signal or an HDTV video signal.

The output of the format converter 107 is supplied to the television receiver 3 through an analog video signal terminal (not shown).

The MPEG audio decoder 108 receives an audio packet from the demultiplexer 105 and carries out the audio decoding processing of MPEG system to form audio data before data compression. The audio data thus decoded are converted to the analog audio signal in a D/A converter 109, and then supplied to the television receiver 3 through an analog audio output terminal (not shown).

Further, in the demultiplexer 105, information necessary for limited reception or SI (Service Information) necessary for services such as EPG (Electric Program Guide), etc. are extracted. This information is transmitted to CPU 111.

An operation instruction to IRD 1 is carried out by a remote controller 115. A remote control signal from the remote controller 115 is received by a photodetecting portion 114, and supplied to CPU 111. Further, a modem 117 is provided, and charging information is transmitted to a broadcast station or charging center through a telephone line through the modem 117.

The setting of the carrier frequency of the reception signal is carried out on the basis of a channel setting signal input by an audience. When a desired program is set, the reception signal of the tuner 101 is set to a predetermined carrier frequency by referring to the NIT (Network Information Table). By referring to the PAT (Program association Table), which contains information on the channel at the carrier frequency, a packet of PID of the PMT (Program Map Table), which contains information on a desired channel, is extracted. The PID of the packet of the video, audio and additional data of the desired channel is obtained by referring to the PMT.

IRD 1 is equipped with an IEEE1394 digital interface 110. The transport stream can be input/output between the demultiplexer 105 and the IEEE1394 digital interface 110.

When the digital recording is carried out in the digital video cassette recording/reproducing apparatus 2, the MPEG2 transport stream comprising a video packet and an audio packet of a desired program is transmitted from the demultiplexer 105 through the IEEE1394 digital interface 110 toward the digital video cassette recording/reproducing apparatus 2.

When the MPEG2 transport stream reproduced in the digital video cassette recording/reproducing apparatus 2 is decoded, the MPEG2 transport stream from the digital video cassette recording/reproducing apparatus 2 is input through the IEEE1394 digital interface 110, and transmitted to the demultiplexer 105. In the demultiplexer 105, the video packet and the audio packet are separated from the MPEG2 transport stream. The video packet is transmitted to the MPEG2 video decoder 106 to be decoded. The audio packet is transmitted to the MPEG audio decoder 108 to be decoded.

IEEE1394 supports both an isochronous transmission mode and an asynchronous transmission mode. When the isochronous transmission mode is used, it is suitably used to transmit data such as MPEG2 streams at high speed. Further, the asynchronous mode is suitably used to transmit commands.

As described later, in IRD 1 to which the present invention is applied, a recording rate indicating command can be transmitted through the IEEE1394 digital interface 110. The recording rate indicating command is a command for setting a recording rate to equipment connected through IEEE1394.

Figure 3:
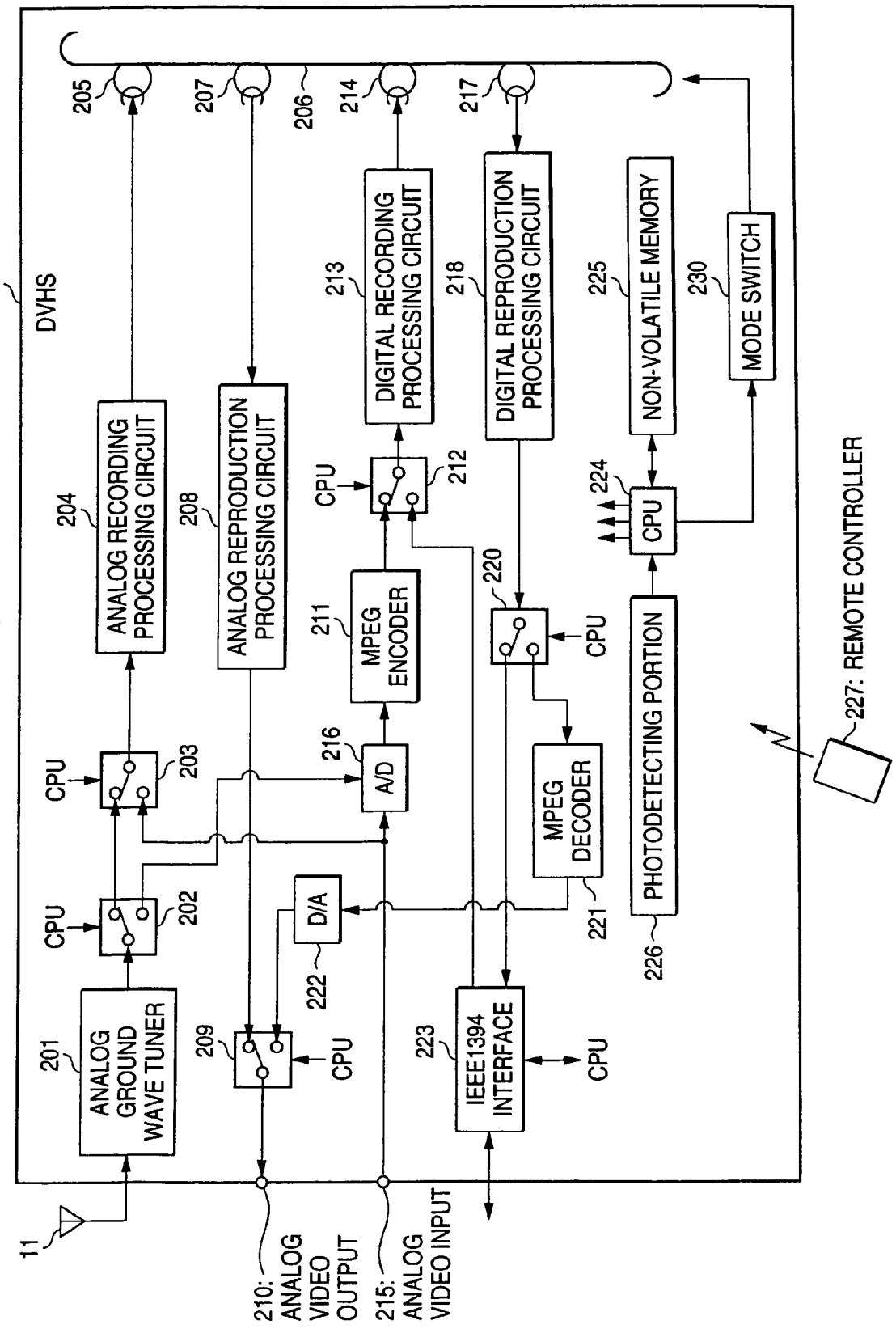
FIG. 3 is a block diagram showing an example of a digital video cassette recording/reproducing apparatus in the digital satellite broadcast system to which the present invention is applied.

FIG. 3 shows the construction of the digital video cassette recording/reproducing apparatus 2. The digital video cassette recording/reproducing apparatus 2 carries out digital recording/reproduction and analog recording/reproduction as described above. In order to carry out the digital recording/reproduction, a digital recording processing circuit 213 and a digital reproduction processing circuit 218 are provided. In order to carry out the analog recording processing, an analog recording processing circuit 204 and an analog reproduction processing circuit 208 are provided.

The overall control is carried out by CPU 224. An operating instruction to the digital video cassette recording/reproducing apparatus 2 is carried out by a remote controller 227, and a remote control signal from the remote controller 227 is received by a photodetecting portion 226 and supplied to CPU 224. A non-volatile memory 225 is connected to CPU 224.

When an MPEG2 transport stream from IRD 1 is recorded, the MPEG2 transport stream is input from IRD 1 through the IEEE1394 digital interface 223. The MPEG2 transport stream is supplied to the digital recording processing circuit 213 through a switch circuit 212. In the digital recording processing circuit 213, the error correction coding processing and the recording modulation processing are carried out on the data of this transport stream. The output of the digital recording processing circuit 213 is supplied to a head 214, whereby the transport stream from IRD 1 is recorded on a tape 206 of a tape cassette mounted on the digital video cassette recording/reproducing apparatus 2.

When the tape cassette on which the MPEG2 transport stream is recorded is reproduced, the reproduction signal of the tape 206 is reproduced in the head 217, and the output of the head 217 is supplied to the digital reproduction processing circuit 218. In the digital reproduction processing circuit 218, the demodulation processing and the error correction processing are carried out. The output of the digital reproduction processing circuit 218 is supplied through the switch circuit 220 to the IEEE1394 digital interface 223, and the transport stream thus reproduced is supplied to IRD 1.

The digital video cassette recording/reproducing apparatus 2 is equipped with a mode switching circuit 230. The recording mode can be set to any one of the STD mode and the HS mode by the mode switching circuit 230. In the STD mode, data can be recorded/reproduced at a rate of 14.1 Mbps, for example. This is suitable to record/reproduce an SDTV stream having a transmission rate of 8 Mbps. In the HS mode, data can be recorded/reproduced at 28.2 Mbps, for example. This is suitable to record/reproduce an HDTV stream having a transmission rate of 24 Mbps.

When the ground wave is analog-recorded, the signal received by the antenna 11 is supplied to a ground wave tuner 201. In the ground wave tuner 201, the reception signal of a desired broadcast is selected, and analog video and audio signals of NTSC system are demodulated from the reception signal. The analog video signal and the analog audio signal are supplied to the analog recording processing circuit 204 through switch circuits 202 and 203. In the analog recording processing circuit 204, the recording processing is carried out on the video signal and the audio signal. That is, the brightness signal is subjected to FM modulation, the chroma signal is converted to a low-band frequency, and the audio signal is subjected to FM modulation. These signals are multiplexed and supplied to the head 205. The analog video and audio signals are recorded on the tape 206 of the mounted tape cassette by the head 205.

Further, the analog video signal and the analog audio signal supplied from analog equipment (for example, 8-mm VTR) connected to the outside can be analog-recorded. The analog video signal and the analog audio signal supplied from an external analog input terminal 215 are supplied to the analog recording processing circuit 204 through the switch circuit 203. The recording processing of the video and audio signals is carried out in the analog recording processing circuit 204. The subsequent processing is the same as the case where the ground wave broadcast is analog-recorded as described above.

When the analog-recorded tape cassette is reproduced, the signal of the tape 206 is reproduced by the head 207, and supplied to the analog reproduction processing circuit 208. In the analog reproduction processing circuit 208, the reproduction is carried out on the video signal and the audio signal. That is, the FM-modulated brightness signal, the low-band converted chroma signal and the FM-modulated audio signal are extracted from the reproduction signal. The FM-modulation processing is carried out on the FM-modulated brightness signal to demodulate the brightness signal, the low-band converted chroma signal is returned to the chroma signal of the carrier frequency of 3.58 MHz. The video signal is formed from the brightness signal and the video signal. The FM demodulation processing is carried out on the FM-demodulated audio signal to demodulate the audio signal. The video signal and the audio signal are output from the analog output terminal 210.

In the digital video cassette recording/reproducing apparatus 2, the signal of the ground wave broadcast and the analog video signal and the analog audio signal supplied from analog equipment connected to the external can be digitally recorded. When the ground wave broadcast signal is digitally recorded, the output of the ground wave tuner 201 is supplied through the switch circuit 202 to an A/D converter 216 to be converted to the digital video signal and the digital audio signal, and then supplied to an MPEG encoder 211. The MPEG encoder 211 carries out the compression coding processing on the digital video signal and the digital audio signal according to the MPEG2 format. The compression-coded digital video signal and digital audio signal are supplied to the digital recording processing circuit 213 through the switch circuit 212. In the digital recording processing circuit 213, the error correction processing and recording modulation processing are carried out, and the processed signal is supplied to the head 214, whereby the signal of the ground wave broadcast is digitally recorded on the tape 206 of the tape cassette mounted in the digital video cassette recording/reproducing apparatus 2.

When a signal supplied from analog equipment connected to the external analog input terminal 215 is digitally recorded, the analog video signal and the analog audio signal supplied from the analog external input terminal are supplied to the A/D converter 216 to be converted to the digital video signal and the digital audio signal, and then these signals are supplied to an MPEG encoder 211. The subsequent processing is the same as the case where the signal of the ground wave broadcast is digitally recorded as described above.

When the signal of the ground wave broadcast thus digitally recorded and the signal supplied from the analog equipment connected to the external analog input terminal 215 are reproduced, the reproduction signal of the tape 206 is reproduced by the head 217, and the output of the head 217 is supplied to the digital reproduction processing circuit 218. The demodulation processing and the error correction processing are carried out in the digital reproduction processing circuit 218. The output of the digital reproduction processing circuit 218 is supplied through the switch circuit 220 to an MPEG decoder 221. In the MPEG decoder 221, compression-expanding processing is carried out on the digital video signal and the digital audio signal, which have been compression-coded. The digital video signal and the audio signal thus decoded are supplied to a D/A converter 222 to be converted to the analog video signal and the analog audio signal, and then output from the analog output terminal 210 through the switch circuit 209.

As described above, in the system to which the present invention is applied, the transport stream is sent from IRD 1 to the digital video cassette recording/reproducing apparatus 2 through the IEEE1394 interface, and the transport stream of the broadcast received by IRD 1 can be directly recorded in the digital video cassette recording/reproducing apparatus 2. In the system to which the present invention is applied, the recording rate indicating command is transmitted from IRD 1 to the digital video cassette recording/reproducing apparatus 2, and the recording mode of the digital video cassette recording/reproducing apparatus can be set on the basis of the command.

In FIG. 1, the digital video cassette recording/reproducing apparatus 2 is connected to IRD 1 through the IEEE1394 digital interface cable 8, and the recording rate indicating command of "STD mode" or "HS mode" is transmitted from IRD 1 to the digital video cassette recording/reproducing apparatus 2. When the recording command of "STD mode" is transmitted, the digital video cassette recording/reproducing apparatus is set to the STD mode with a recording rate of 14.1 Mbps, and when the recording command of "HS mode" is transmitted, it is set to the HS mode with a recording rate of 28.2 Mbps.

In the case of some types of recording/reproducing apparatuses connected to IRD 1, there may be a case where the recording/reproducing apparatuses cannot be set to a recording rate requested by the recording rate indicating command. When the recording rate setting command is transmitted from IRD 1, but the requested recording rate cannot be set, the equipment may return a response indicating the fact that the recording rate cannot be set, and IRD 1 may display an alarm in accordance with this response.

When the transport stream from IRD 1 is recorded in the digital video cassette recording/reproducing apparatus 2, the transport stream is transmitted from IRD 1 to the digital video cassette recording/reproducing apparatus 2. There are cases where the transport stream is an HDTV transport stream and where the transport stream is an SDTV transport stream. The digital video cassette recording/reproducing apparatus 2 is required to be set to the HS mode when the HDTV transport stream is recorded, or to the STD mode when the SDTV transport stream is recorded.

Therefore, in an embodiment of the present invention, when there is a probability that the transmission rate of the transport stream transmitted from IRD 1 through IEEE1394 will change, the recording rate indicating command is transmitted from IRD 1 to the digital video cassette recording/reproducing apparatus 2 before the transmission rate is changed.

That is, when IRD 1 and the digital video cassette recording/reproducing apparatus 2 are connected through the IEEE1394 interface cable 8, the recording rate indicating command is transmitted from IRD 1 to the digital video cassette recording/reproducing apparatus 2.

When the transport stream is transmitted from IRD 1 to the digital video cassette recording/reproducing apparatus 2, the recording rate setting command is transmitted from IRD 1 before the recording is started.

In the digital satellite broadcast services, it is assumed that a channel transmitted with SDTV frames like a news channel and a channel transmitted with HDTV frames like a cinema channel are separated from each other. Accordingly, when the channel is switched, the recording rate setting command is transmitted from IRD 1 to accurately set the recording mode of the digital video cassette recording/reproducing apparatus 2.

Further, it is also assumed that even in the case of the same channel the SDTV stream and the HDTV stream may be switched on a program basis. For example, HDTV is set when a movie is broadcasted and SDTV is set when news is broadcasted. Accordingly, when the program is changed, the recording rate setting command is transmitted from IRD 1 to accurately set the recording mode of the digital video cassette recording/reproducing apparatus 2.

Figure 4:
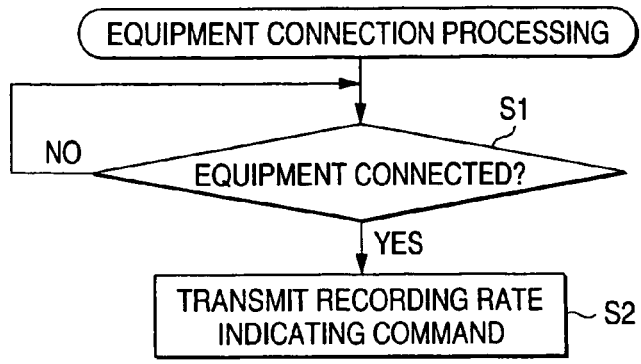
FIG. 4 is a flowchart used to explain an embodiment of the present invention.
Figure 5:
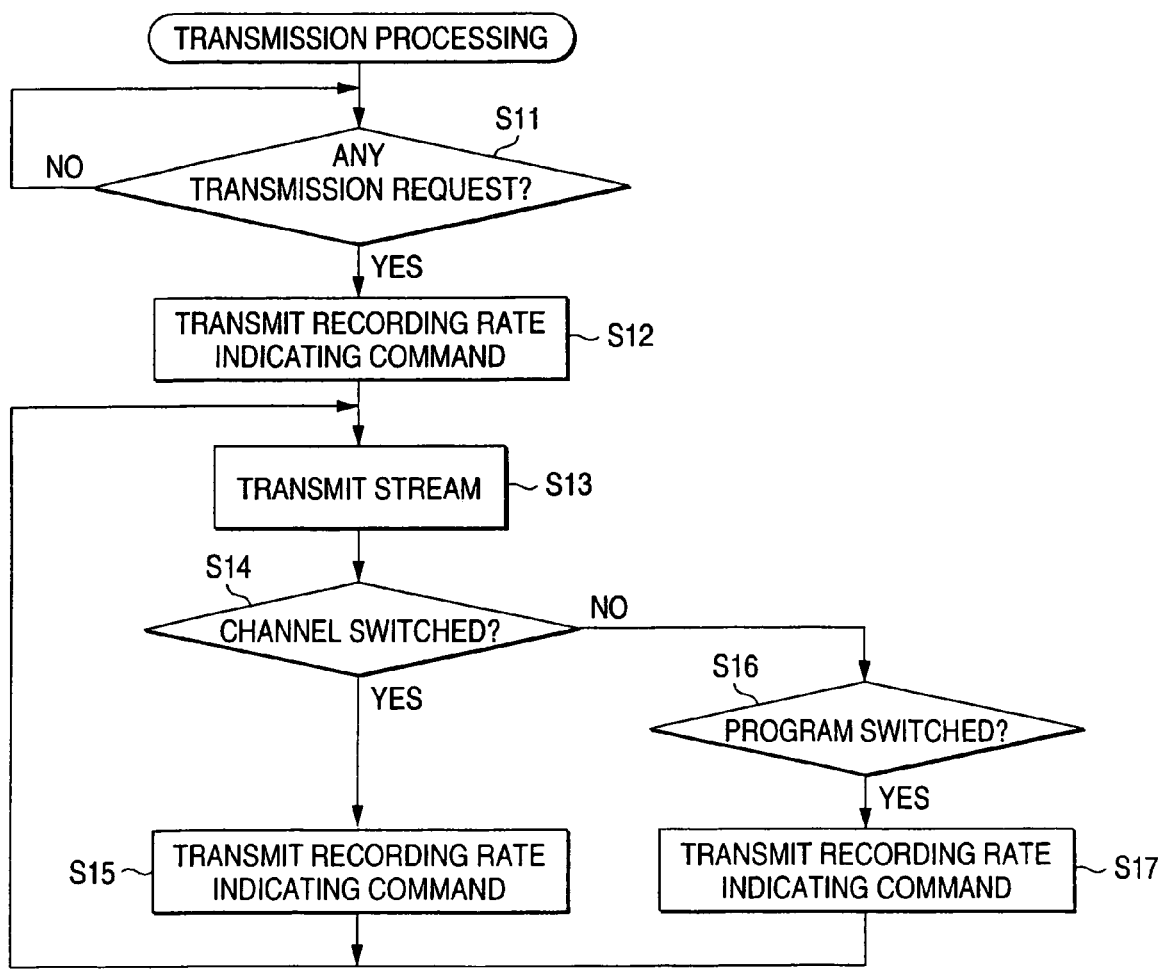
FIG. 5 is a flowchart used to explain an embodiment of the present invention.

FIGS. 4 and 5 are flowcharts showing the processing of transmitting a recording rate indicating command before the transmission rate is changed when there is a probability that the transmission rate of a transport stream transmitted from IRD 1 through the IEEE1394 interface will change.

FIG. 4 shows the processing when equipment is connected. In FIG. 4, IRD 1 judges whether the digital video cassette recording/reproducing apparatus 2 is connected through the IEEE1394 interface (step S1). If it is judged that the digital video cassette recording/reproducing apparatus 2 is connected to IRD 1, the recording rate setting command, corresponding to the stream to be transmitted, is transmitted from IRD 1 to the digital video cassette recording/reproducing apparatus 2 (step S2).

When IRD 1 and the digital video cassette recording/reproducing apparatus 2 are connected through the IEEE1394 interface cable 8 through the above processing, the recording rate indicating command is transmitted from IRD 1 to the digital video cassette recording/reproducing apparatus 2.

FIG. 5 shows the processing when data are transmitted after equipment is connected. In FIG. 5, it is judged whether there is a transmission request of a transport stream from IRD 1 to the digital video cassette recording/reproducing apparatus 2 (step S11). If it is judged that there is a transmission request, the recording rate indicating command is transmitted from IRD 1 to the digital video cassette recording/reproducing apparatus 2 just before the stream is transmitted (step S12). After the recording rate indicating command is transmitted, the transport stream is transmitted from IRD 1 to the digital video cassette recording/reproducing apparatus 2 (step S13).

It is judged whether the reception channel is switched by a user while the transport stream is transmitted from IRD 1 to the digital video cassette recording/reproducing apparatus 2 (step S14). If it is judged that the reception channel is switched, the recording rate indicating command corresponding to the transmission rate of the stream of the channel after the switching operation is transmitted from IRD 1 to the digital video cassette recording/reproducing apparatus 2 (step S15), and the processing returns to the step S13.

If it is judged in step S14 that the reception channel has not been switched, it is judged whether the program is switched or not (step S16). If it is judged that the program is switched, the recording rate indicating command corresponding to the transmission rate of the stream of the program after the switching is transmitted to the digital video cassette recording/reproducing apparatus 2 (step S17), and the processing returns to the step S13.

When the transport stream is transmitted from IRD 1 to the digital video cassette recording/reproducing apparatus 2 through the above processing, a setting command is transmitted from IRD 1 to the digital video cassette recording/reproducing apparatus 2 just before the recording is started. When the channel is switched, the recording rate setting command is transmitted from IRD 1 to the digital video cassette recording/reproducing apparatus 2, and further when the program is switched, the recording rate setting command is transmitted from IRD 1 to the digital video cassette recording/reproducing apparatus 2.

The recording rate setting command transmitted from IRD 1 to the digital video cassette recording apparatus 2 is generated in accordance with whether a broadcast, which is currently received or will be received by IRD1, is SDTV or HDTV. It is judged from the table of PMT whether the stream of the reception channel is an SDTV stream or an HDTV stream.

That is, the transport stream of the digital satellite broadcast contains information called as SI (Service Information). SI has the table of PMT (Program Map Table), and the table of PMT contains information for indicating the content of each channel with a component descriptor as shown in FIG. 6.

In FIG. 6, stream_content (component content) is a 4-bit field, and this field means the type of the stream (picture, voice, data) according to the table show in FIG. 7. Component_type (component type) is a 8-bit field, and this field indicates how the type of the component such as picture, voice, data, is encoded according to the table shown in FIG. 7. Component_tag is a 8-bit field, and it is a label for identifying the component stream. ISO__639_language_code (language code) is a 24-bit field, and this language code identifies the language of the component (voice or data) and the language of a character description contained in the descriptor thereof.

On the basis of the component content and the description of the component identification shown in FIG. 7, it is judged whether the picture received is SDTV or HDTV. That is, if the component content is "0x01" and the component type is "0x01", the program is broadcasted in the SDTV mode (525 in scanning number, 4:3 in aspect ratio), and if the component content is "0x01" and the component type is "0xB2", the program is broadcasted in the HDTV mode (1125 in scanning number, 16:9 in aspect ratio).

The judgment as to whether the program being broadcasted is switched or not is made from EIT (Event Information Table). A program name, a program start time, etc. are described in the table of EIT. By using EIT, it can be judged whether a program which is about to be received is HDTV or SDTV.

As a manner of transmitting programs and additional information, various methods have been proposed in addition to the broadcast for transmitting PMT or EIT as described above. The judgment of the transmission rate of the stream of a program being currently received or a program which is about to be switched is not limited to one using PMT or EIT as described above, and it is suitably determined in consideration of the transmission manner of transmitting programs and additional information in every broadcast.

With respect to the recording rate indicating command, it is not set as a command expressing the recording mode itself like "STD mode" or "HS mode", but a necessary recording rate value may be contained in the command. For example, in case of an SDTV transport stream, "mode of 8 Mbps or more is set", and in case of an HDTV transport stream, "mode of 24 Mbps or more is set". If the value itself of a necessary recording rate itself is contained in the command, it is sufficient to set a mode having a recording rate above the necessary recording rate at an equipment side connected to IRD 1.

In the above embodiment, when there is a probability that the transmission rate of the bit stream of MPEG2 output from IRD 1 through the interface of IEEE1394 will change, specifically when IRD 1 and the digital video cassette recording/reproducing apparatus 2 are mounted just before the stream is transmitted when the channel is switched, or when the program is changed, the recording rate indicating command is transmitted. However, a modification may be made so that all of them are not used, and they are used in combination.

The recording rate indicating command may be transmitted from IRD 1 every predetermined time (for example, every 1 second). If the recording rate indicating command is transmitted every predetermined time at all times, the proper recording mode corresponding to the transmission rate of the stream from IRD 1 is correctly set.

Figure 8:
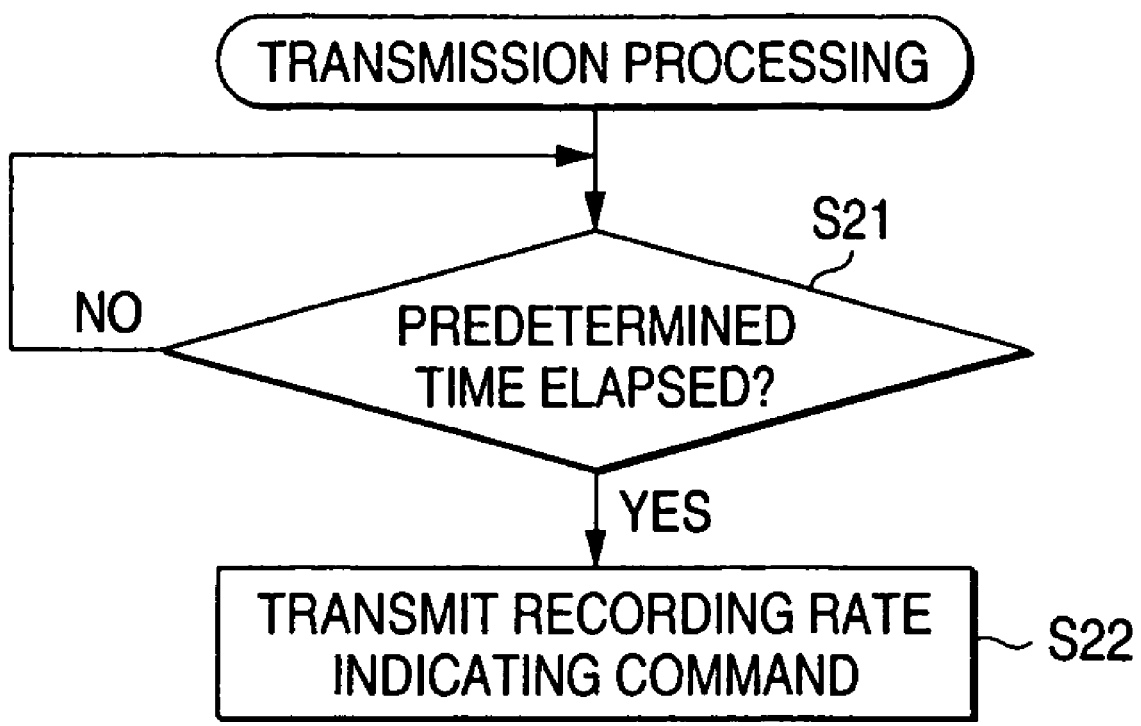
FIG. 8 is a flowchart used to explain an embodiment of the present invention.

That is, as shown in FIG. 8, it is judged whether the predetermined time elapses (step S21), and if the predetermined time is judged to elapse, the recording rate indicating command is transmitted from IRD 1 to the digital video cassette recording/reproducing apparatus 2 (step S22).

Further, a modification may be made to have a command for inquiring about the recording mode, and if the recording mode inquiring command is received at the IRD 1 side, the recording rate indicating command is transmitted. With this modification, in the digital video cassette recording/reproducing apparatus 2, the transmission rate of the stream is checked and then the recording rate can be set just before the recording operation.

Figure 9A:
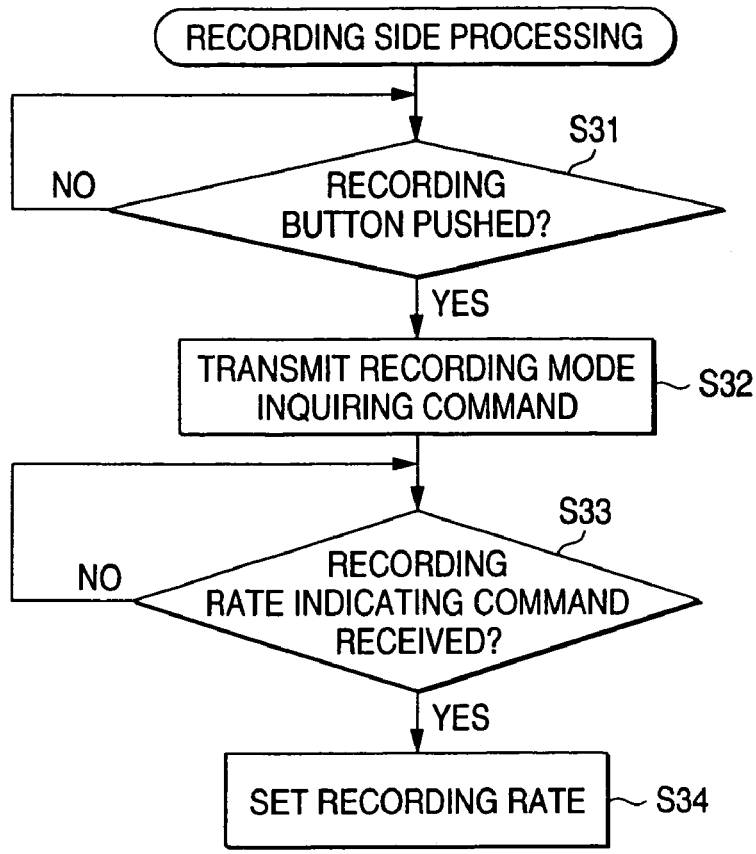
FIGS. 9A and 9B are flowcharts used to explain an embodiment of the present invention.

That is, as shown in FIG. 9A, it is judged at the digital video cassette recording/reproducing apparatus 2 side whether a recording button is pushed or not (step S31). If the recording button is pushed, the recording mode inquiring command is transmitted (step S32).

Figure 9B:
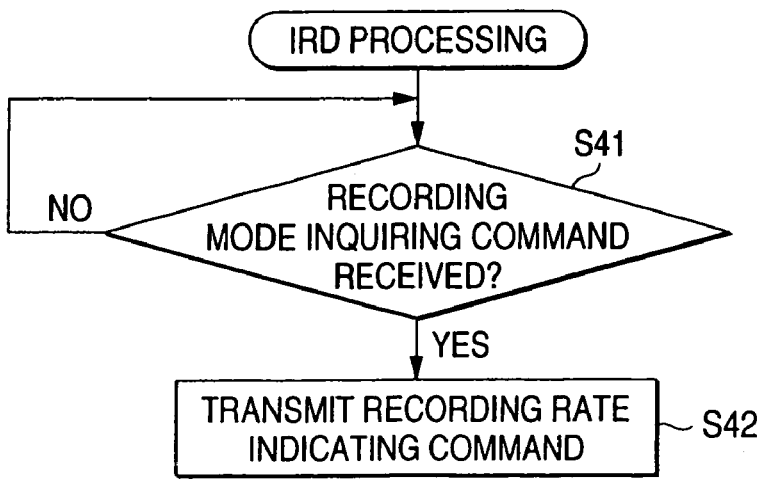

At the IRD 1 side, it is judged as shown in FIG. 9B whether the recording mode inquiring command is received or not (step S41), and if the recording mode inquiring command is received, the recording rate indicating command is transmitted (step S42).

The digital video cassette recording/reproducing apparatus 2 side waits to receive the recording rate indicating command (step S33) as shown in FIG. 9A (step S33), and if the recording rate indicating command from IRD 1 is received, the recording rate is set in accordance with the recording rate indicating command (step S34).

When the MPEG2 stream output from IRD 1 through the IEEE1394 interface is recorded by the digital video cassette recording/reproducing apparatus 2, the recording rate indicating command is transmitted from IRD 1 to the digital video cassette recording/reproducing apparatus 2 just before the recording. Therefore, when the recording operation is started by the digital video cassette recording/reproducing apparatus 2, the proper recording mode can be correctly set.

If the recording rate indicating command is transmitted from IRD 1 to the digital video cassette recording/reproducing apparatus 2 before the recording is started in the digital video cassette recording/reproducing apparatus 2 as in the case of the above embodiment, the recording rate can be properly set whether the stream being received is HDTV or SDTV, and the stream from IRD 1 can be recorded in the digital video cassette recording/reproducing apparatus 2. The transmission rate may be changed in the middle of the recording. Mere transmission of the recording rate indicating command from IRD 1 to the digital video cassette recording/reproducing apparatus 2 before the recording is started cannot support the case where the transmission rate is changed in the middle of the recording operation.

Therefore, in such a case that the transmission rate of the stream is changed in the middle of the recording operation, the recording operation is temporarily stopped, and the recording mode is reset.

Figure 10:
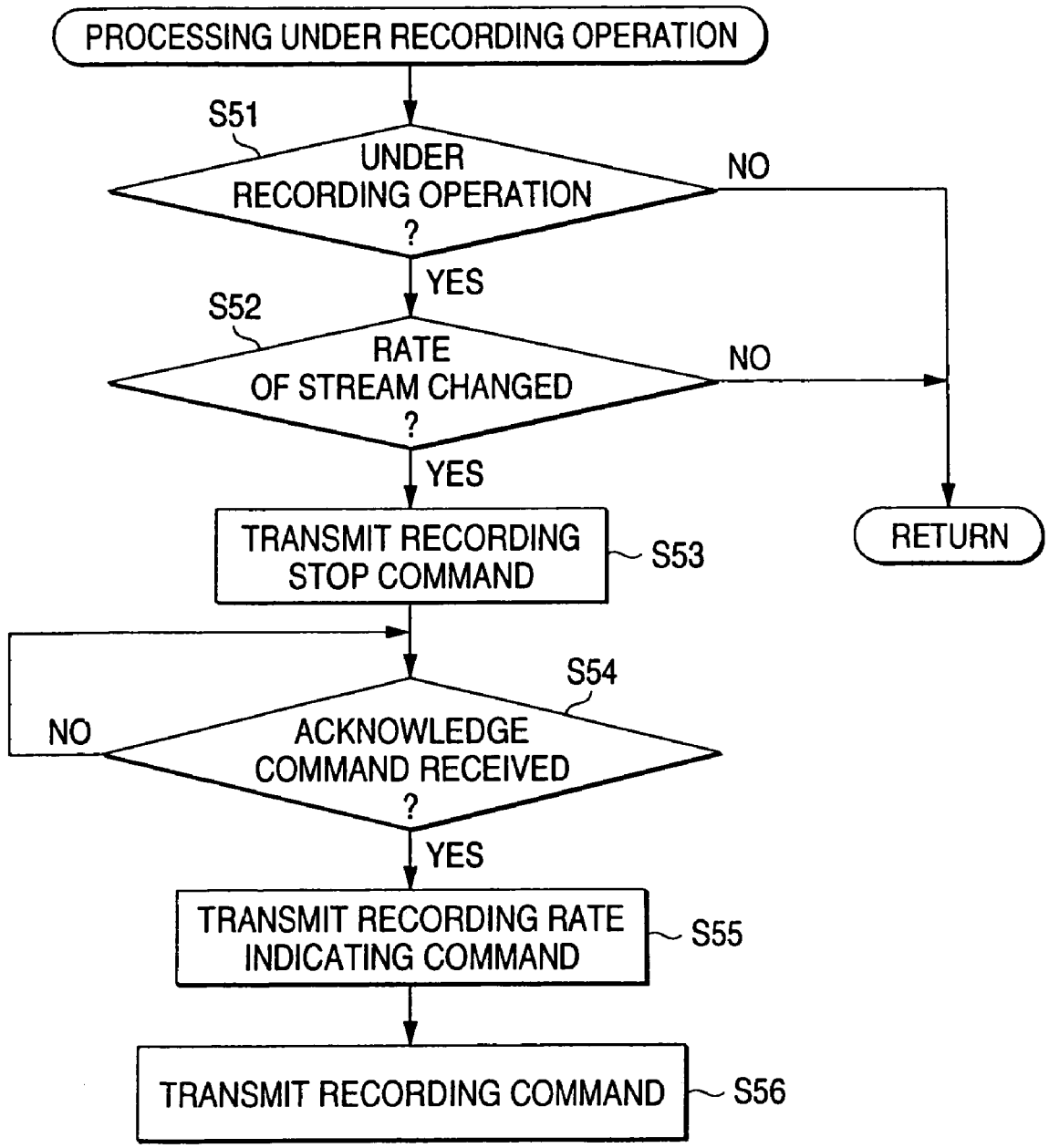
FIG. 10 is a flowchart used to explain an embodiment of the present invention.

FIG. 10 shows the processing in such a case that the transmission rate of the stream is changed during the recording of the transport stream from IRD 1 in the digital video cassette recording/reproducing apparatus 2. That is, it shows the processing when SDTV is switched to HDTV or HDTV is switched to SDTV at the program switching time in such a case that plural programs are continuously recorded.

In FIG. 10, it is judged in IRD 1 whether the recording is being carried out in the digital video cassette recording/reproducing apparatus 2 (step S51). If it is recording, and the broadcast being received is switched from SDTV to HDTV or from HDTV to SDTV, it is judged whether the transmission rate of the stream is changed (step S52). When the transmission rate of the stream is switched in the progress of the recording operation, a recording stop command is issued from IRD 1 to the digital video cassette recording/reproducing apparatus 2 (step S53).

When receiving the recording stop command, the digital video cassette recording/reproducing apparatus 2 stops the recording and returns an acknowledge command to IRD 1.

At the IRD 1 side it is judged whether the acknowledge command is received or not (step S54). If the acknowledge command is received, the recording rate indicating command is transmitted (step S55) and then a recording command is returned (step S56).

When the transmission rate of the stream of the broadcast being received is switched in the progress of the recording operation through the above processing, the recording mode is switched in accordance with the stream of the broadcast being received after the recording is temporarily stopped, and then the recording operation is resumed. Accordingly, the variation of the transmission rate of the received broadcast in the progress of the recording operation can be supported.

The invention claimed is:

1. A data recording method for use in a digital broadcast receiver, comprising:

receiving and decoding a digital broadcast in which video data and audio data are transmitted in the form of a transport stream to provide a received transport stream;

connecting a first interface of the digital broadcast receiver to a corresponding interface of a recording apparatus;

determining information corresponding to a transmission rate of the received transport stream;

generating a recording rate setting command on the basis of the information corresponding to the transmission rate, when the transmission rate corresponds to a standard definition rate the recording rate setting command indicates that a recording rate should be set greater than or equal to a first specified value, and when the transmission rate corresponds to a high definition rate the recording rate setting command indicates that the recording rate should be set greater than or equal to a second specified value, the recording rate setting command not being a mode command or a single rate command; and transmitting the recording rate setting command to the recording apparatus through the first interface and the corresponding interface when the connection between the first interface and the corresponding interface is initiated, when a request command is received from the recording apparatus, or periodically after predetermined intervals.

2. The data recording method as claimed in claim 1, wherein said transmitting step includes transmitting the recording rate setting command just before the received transport stream is transmitted to the recording apparatus.

3. The data recording method as claimed in claim 1, wherein said transmitting step includes transmitting the recording rate setting command before the recording apparatus starts recording the received transport stream.

4. The data recording method as claimed in claim 1, wherein said transmitting step includes transmitting the recording rate setting command when a reception channel is switched.

5. The data recording method as claimed in claim 1, wherein said transmitting step includes transmitting the recording rate setting command when a broadcast program is changed.

6. The data recording method as claimed in claim 1, further comprising:

temporarily stopping a recording operation when the transmission rate of the received transport stream changes, wherein said transmitting step includes transmitting an updated rate setting command after the recording operation has been temporarily stopped.

7. The data recording method as claimed in claim 1, wherein the information corresponding to the transmission rate indicates that the digital broadcast includes a high-definition television broadcast or that the digital broadcast includes a standard television broadcast.

8. The data recording method as claimed in claim 1, further comprising:

receiving a response from the recording apparatus when a recording rate corresponding to a generated recording rate setting command cannot be set in the recording apparatus.

9. The data recording method as claimed in claim 1, wherein the first interface and the corresponding interface each include an IEEE1394 interface.

10. A recording apparatus, comprising:

an interface operable to support communication with a digital broadcast receiver;

a recorder operable to record a transport stream received from the digital broadcast receiver through said interface; and a processor operable to transmit a request for a command to the digital broadcast receiver through said interface and to set a recording rate of said recorder in accordance with a recording rate setting command received from the digital broadcast receiver through said interface in response to the request.

11. The recording apparatus as claimed in claim 10, wherein said processor is further operable to cause an alarm to be displayed in said recording apparatus when the recording rate corresponding to the received recording rate setting command cannot be set.

12. The recording apparatus as claimed in claim 10, wherein said interface is an IEEE1394 interface.

* * * * *